UNITED STATES PATENT OFFICE.

NATHANIEL A. THOMPSON, OF KANSAS CITY, KANSAS, ASSIGNOR TO ROCK HILL PAINT AND CLOTH COMPANY, A CORPORATION OF DELAWARE.

MINERAL PAINT-PIGMENT.

1,347,191. Specification of Letters Patent. Patented July 20, 1920.

No Drawing. Application filed June 24, 1919. Serial No. 306,395.

*To all whom it may concern:*

Be it known that I, NATHANIEL A. THOMPSON, a citizen of the United States, residing at Kansas City, in the county of Wyandotte and State of Kansas, have invented certain new and useful Improvements in Mineral Paint-Pigments, of which the following is a specification.

My invention consists in the production of paint pigment and its chief object is to provide a paint pigment, which will have but slow disintegrating or decomposing character when exposed to the atmosphere and will have both permanency and stability when exposed to light. The paint of which I am the inventor comprises a composition forming a pigment which is associated with a vehicle, such as a drying oil of the linseed or cotton seed type and in some cases a diluent of a drying nature, such as turpentine.

The body is formed by a composition of the following substances in or about the proportions named:

| | |
|---|---|
| Ferric oxid | 46 % |
| Calcium oxid | 6 % |
| Sulfur | .5% |
| Magnesium oxid | 36.5% |
| Silicon dioxid | 10.5% |
| Aluminum oxid | .5% |

These substances are mixed and ground to a fine powder and linseed or cotton seed oil added until the desired consistency is reached.

It has been found by actual experience that two pounds of the composition and four gills of the oil form a desirable proportion of oil and body but it will be understood that this is but one of many that may be used and that this invention is not limited to the proportions of the composition and oil.

After the oil and composition are mixed they are allowed to stand for about twenty-four hours and the scum that has formed is skimmed off. Once a day for the next succeeding nine to eleven days, depending on the temperature and the fineness to which the compound has been ground, the scum is taken off the top of the mixture.

At the end of this time the paint is ready for use and no more scum will form on the surface of the same. The paint now consists of a fine grained pigment and oil which have been mingled to form a composition that serves the purposes of white lead paint. It has been found by actual test to outlast other paints under the same conditions. Often one coat of my paint will outlast a similar coat of the ordinary varieties on the market where they have been subjected to exactly the same conditions of wear. Its waterproofing action is superior to other varieties in addition to which it will hold its luster a longer period of time.

Any substance covered by my paint is efficiently fire-proofed, which is a desirable quality. The paint sticks to either wood or iron with equal facility and does not crack or peel off under usual circumstances of wear or weather.

Because of the non-poisonous nature of the ingredients used paint made by my process is not injurious to the health of those working with it. It may be used for the painting of the roofs of houses where the rain-water is used for drinking purposes without the slightest danger of poisoning.

Having thus described my invention, I claim as new and desire to secure by Letters Patent the following:

1. A new pigment comprising ferric oxid, calcium oxid 6%, magnesium oxid 36.5%, silicon oxid 10.5%, sulfur .5%, and aluminum oxid .5%.

2. A new pigment comprising ferric oxid 46%, calcium oxid 6%, magnesium oxid 36.5%, silicon oxid 10.5%, sulfur .5%, aluminum oxid .5%.

3. A new pigment comprising ferric oxid, calcium oxid 6%, magnesium oxid, silicon oxid, sulfur .5%, and aluminum oxid .5%.

In testimony whereof I affix my signature.

NATHANIEL A. THOMPSON.